(12) United States Patent
Hasegawa et al.

(10) Patent No.: US 7,686,388 B2
(45) Date of Patent: Mar. 30, 2010

(54) WIRE/PIPE SUPPORT DEVICE OF MOTORCYCLE

(75) Inventors: Yosuke Hasegawa, Saitama (JP); Jun Nakajima, Saitama (JP); Kenta Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 11/511,315

(22) Filed: Aug. 29, 2006

(65) Prior Publication Data

US 2007/0049059 A1    Mar. 1, 2007

(30) Foreign Application Priority Data

Aug. 31, 2005  (JP)  ............... 2005-250918
Nov. 28, 2005  (JP)  ............... 2005-341853

(51) Int. Cl.
*B62J 6/18*  (2006.01)

(52) U.S. Cl. ........................... 296/208; 296/63

(58) Field of Classification Search ........... 296/208, 296/63; 174/97; 180/225
See application file for complete search history.

(56) References Cited

U.S. PATENT DOCUMENTS

| 3,485,467 A | * | 12/1969 | Fuchs et al. | ............. | 24/601.2 |
| 3,636,595 A | * | 1/1972 | Wines | ............. | 24/555 |
| 3,893,647 A | * | 7/1975 | Kennedy | ............. | 248/68.1 |
| 4,678,054 A | * | 7/1987 | Honda et al. | ............. | 180/225 |
| 5,263,671 A | * | 11/1993 | Baum | ............. | 248/68.1 |
| 5,979,965 A | * | 11/1999 | Nishijima et al. | ............. | 296/70 |
| 6,062,633 A | * | 5/2000 | Serizawa | ............. | 296/199 |
| 6,537,641 B1 | * | 3/2003 | Kroll | ............. | 428/95 |
| 7,038,133 B2 | * | 5/2006 | Arai et al. | ............. | 174/72 A |
| 7,223,918 B2 | * | 5/2007 | Gelibert | ............. | 174/95 |
| 7,318,621 B2 | * | 1/2008 | Suzuki et al. | ............. | 296/208 |
| 2003/0155793 A1 | * | 8/2003 | Yoshihara et al. | ............. | 296/208 |

FOREIGN PATENT DOCUMENTS

JP          62-68186 A       3/1987

\* cited by examiner

*Primary Examiner*—Jason S Morrow
(74) *Attorney, Agent, or Firm*—Birch, Stewart, Kolasch & Birch, LLP

(57) ABSTRACT

The present invention provides a wire/pipe support device of a motorcycle that can possess a sufficient space for accommodating a wire/pipe without increasing the degree of forming of a vehicle body frame. A wire/pipe support device includes a groove-shaped engaging portion that is engaged with a main frame that constitutes a vehicle body frame of a motorcycle and has a lower surface thereof opened. A groove-shaped accommodating portion receives the wire/pipe thereon and has an upper surface thereof opened. The engaging portion is mounted on the vehicle body frame by engaging the engaging portion with the vehicle body frame from above. The wire/pipe is placed on the accommodating portion. The wire/pipe support device is pushed from above by a fuel tank directly or by way of a cushion member thus preventing the floating of the wire/pipe support device from the vehicle body frame and the rotation of the wire/pipe support device about the vehicle body frame.

13 Claims, 5 Drawing Sheets

WIRE/PIPE SUPPORT DEVICE OF MOTORCYCLE

CROSS-REFERENCE TO RELATED APPLICATIONS

This nonprovisional application claims priority under 35 U.S.C. § 119(a) on Patent Application Nos. 2005-250918 and 2005-341853, filed in Japan on Aug. 31, 2005 and Nov. 28, 2005, respectively. The entirety of each of the above-identified applications is incorporated herein by reference.

BACKGROUND OF THE INVENTION

1. Field of the Invention

The present invention relates to a wire/pipe support device of a motorcycle that supports a wire/pipe arranged along a vehicle body frame.

2. Description of Background Art

In a motorcycle, a wire/pipe is arranged along a vehicle body frame. Usually, the wire/pipe is supported on the vehicle body flame by way of fixing members such as fasteners or clamping members. Since the wire/pipe is assembled to the vehicle body frame by way of the fixing members, the assembling operation takes time. In other words, the assembling operation is cumbersome. Furthermore, there may be a situation where the wire/pipe is observed from the outside.

Accordingly, in the assembling operation of a wire/pipe, there has been proposed a technique which does not take time and effort and can prevent the wire/pipe from being observed from the outside after assembling (for example, see Japanese Patent Laid-Open No. 62-68186).

FIG. 1 of Japanese Patent Laid-Open No. 62-68186 is a transverse cross-sectional view of a main pipe for explaining a wire accommodating device of a motorcycle according to one embodiment of the invention described in Japanese Patent Laid-Open No. 62-68186. In the main pipe that includes an outer wall 22a and an inner wall 22b, an accommodating portion 22c is formed in a portion of the inner wall 22b. A wire bundle 10 that is covered with a protective tube 11 is accommodated in the accommodating portion 22c. Due to such a constructions, it is possible to provide the wire accommodating device that can prevent wires or pipes from being observed from the outside of a vehicle. At the same time, it does not take time to assembling the wires or the like.

However, since the wires or the like pass through a space defined in the inside of a vehicle body frame, a cross-sectional area of the space that accommodates the wires or the like is limited. Furthermore, it is necessary to form an accommodating portion for the wires or the like in the vehicle body frame. Therefore, it is necessary to increase the degree of forming of the vehicle body frame by increasing the forming steps of the vehicle body frame. When the degree of forming is increased, there arises a drawback that a cost of the vehicle body frame is increased as well.

SUMMARY OF THE INVENTION

It is an object of the present invention to provide a wire/pipe support device of a motorcycle that can possess a sufficient space for accommodating a wire/pipe without increasing the degree of forming of a vehicle body frame.

A first aspect of the present invention is directed to a motorcycle that supports a wire/pipe on a vehicle body frame. At least one wire/pipe support member which forms a groove-shaped engaging portion that is engaged with the vehicle body frame and has a lower surface thereof opened and a groove-shaped accommodating portion which places the wire/pipe thereon and has an upper surface thereof opened as one member is mounted on the vehicle body frame by having the engaging portion thereof engaged with the vehicle body frame from above. The wire/pipe is placed on the accommodating portion thus supporting the wire/pipe on the vehicle body frame side.

According to a second aspect of the present invention, a wire/pipe support device of the motorcycle is configured to be pushed from above by a fuel tank directly or by way of a cushion member thus preventing the floating of the wire/pipe support device from the vehicle body frame and the rotation of the wire/pipe support device about the vehicle body frame.

According to a third aspect of the present invention, the accommodating portion is arranged on left and right sides with the engaging portion arranged therebetween.

According to a fourth aspect of the present invention, the accommodating portion has a fixed width in the longitudinal direction of a vehicle body.

According to a fifth aspect of the present invention, the accommodating portion is arranged below a fuel tank and is arranged not to project from the fuel tank as viewed in a plan view.

According to a sixth aspect of the present invention, the accommodating portion is arranged below a seat and is arranged not to project from the seat as viewed in a plan view.

According to the first aspect of the present invention, an engaging portion and a groove-shaped accommodating portion are formed in the wire/pipe support device that is formed of one member. The wire or pipe is placed on the accommodating portion to accommodate the wire/pipe therein and hence, forming of the vehicle body frame becomes unnecessary. By supporting the wire/pipe using such a wire/pipe support device, the forming of the vehicle body frame that supports the wire/pipe becomes unnecessary and hence, it is unnecessary to increase the degree of forming. Accordingly, an increase of the manufacturing cost of the vehicle body frame can be avoided.

In addition, the wire/pipe is placed on the accommodating portion by increasing a size of the accommodating portion. Therefore, it is possible to ensure a cross-sectional area for accommodating a required quantity of the wires or pipes. Furthermore, the groove-shaped engaging portion that has a lower surface thereof opened and engaged with the vehicle body frame is formed. The engaging portion can be engaged with the vehicle body frame from above so as to mount the accommodating portion on the vehicle body frame and hence, the mounting operation can be easily performed.

According to the second aspect of the present invention, the wire/pipe support device is configured to be pushed from above by the fuel tank directly or by way of a cushion member thus preventing the floating of the wire/pipe support device from the vehicle body frame and the rotation of the wire/pipe support device about the vehicle body frame. Therefore, it is possible to fixedly secure the wire/pipe or the like to the vehicle body frame.

According to the third aspect of the present invention, the accommodating portion is arranged on left and right sides with the engaging portion arranged therebetween. Therefore, the accommodating portion is well-balanced and the accommodating portion can easily maintain its posture before being covered with the fuel tank from above. Since the accommodating portion can easily maintain its posture, it is possible to enhance the mountability of the wire/pipe. Furthermore, by increasing the width of the accommodating portion that is provided on left and right sides, the accommodating portion can further enhance the ability of accommodating the wires or pipes.

According to the fourth aspect of the present invention, the accommodating portion is allowed to have a fixed width in the longitudinal direction of the vehicle body. Therefore, the accommodating portion has an advantage that the wire/pipe is hardly observed as viewed from below.

According to the fifth aspect of the present invention, the accommodating portion is arranged below the fuel tank and is arranged not to project from the fuel tank as viewed in a plan view thus preventing the wire/pipe from being observed as viewed from above.

According to the sixth aspect of the present invention, the accommodating portion is arranged below a seat and, at the same time, arranged not to project from the seat as viewed in plan view. Therefore, the accommodating portion has an advantage that the accommodating portion can prevent the observation of the wire/pipe from above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
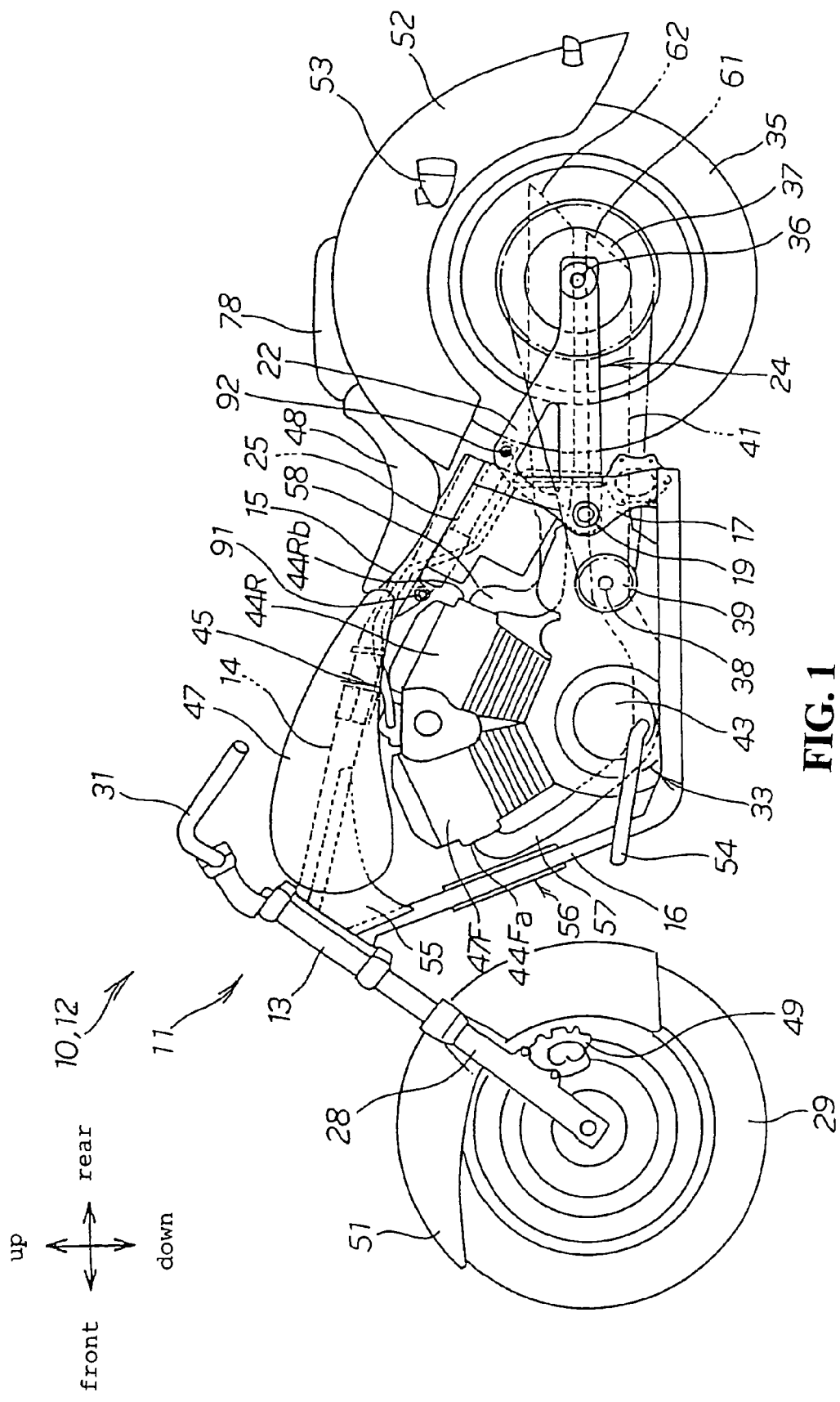
FIG. 1 is a side view of a motorcycle that includes a wire/pipe support device according to an embodiment of the present invention.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

FIG. 1 is a side view of a motorcycle that is provided with a wire/pipe support device according to an embodiment of the present invention. A motorcycle 10 is a vehicle that includes a body frame 11. The body frame 11 includes a head pipe 13 that is mounted on a front end portion of a vehicle 12. A main frame 14 rearwardly extends from the head pipe 13. Seat rails 15, 15 (only numeral 15 on the reader's side shown) rearwardly extend from a rear end portion of the main frame 14. Down frames 16, 16 (only numeral 16 on reader's side shown) extend downwardly and obliquely from the head pipe 13. Rear frames 17,17 (only numeral 17 on reader's side shown) connect rear ends of the down frames 16, 16 and rear ends of the seat rails 15, 15 to each other. A rear swing arm 24 rotatably mounts a pivot shaft 19 on the rear frames 17, 17 such that the swing arm 24 is vertically swingable about the pivot shaft 19. The rear swing arm 24 includes an upper arm portion 22. A rear cushion unit 25 connects the upper arm portion 22 of the rear swing arm 24 and a rear portion of the main frame 14.

Reference numeral 91 identifies a first shaft member that connects an upper end portion of the rear cushion unit 25 and the main frame 14. Reference numeral 92 identifies a second shaft member that connects a lower end portion of the rear cushion unit 25 and the upper arm portion 22.

Furthermore, in the motorcycle 10, a front fork 28 is steerably mounted on the head pipe 13. A front wheel 29 is rotatably mounted on a lower end of the front fork 28. A steering handle 31 is mounted on an upper portion of the front fork 28. An engine 33 is arranged in a space that is surrounded by the main frame 14 and the down frame 16. A rear wheel 35 is rotatably mounted on a rear end of the rear swing arm 24. A chain 41 that transmits a driving force of the engine 33 to the rear wheel 35 extends between and is wound around a sprocket wheel 37 mounted on a shaft 36 of the rear wheel 35 and a sprocket wheel 39 mounted on an output shaft 38 of the engine 33.

The engine 33 is a V-type two-cylinder engine that includes a crankcase 43, two cylinder portions 44F, 44R raised from the crankcase 43 and a fuel supplying device 45 that supplies fuel to the cylinder portions 44F, 44R. The fuel supplying device 45 will be further explained below.

Reference numeral 47 identifies a fuel tank. Reference numeral 48 identifies a driver's seat. Reference numeral 49 identifies a front brake unit. Reference numeral 51 identifies a front fender. Reference numeral 52 identifies a rear fender. Reference numerals 53, 53 (only numeral 53 on reader's side shown) identify rear blinkers or turn signals. Reference numerals 54, 54 (only numeral 54 on reader's side shown) identify a driver's steps. Reference numerals 55, 55 (only numeral 55 on reader's side shown) identify gussets for reinforcing the vehicle body frame 11. Reference numeral 56 identifies a radiator unit.

An exhaust system includes a first exhaust pipe 57 connected to a front surface 44Fa of the front cylinder portion 44F provided on the V-type engine 33. The first exhaust pipe 57 rearwardly extends. A first muffler 61 is connected to a rear portion of the first exhaust pipe 57. In the same manner, a second exhaust pipe 58 is connected to a back surface 44Rb of the rear cylinder portion 44R. A second muffler 62 is connected to a rear portion of the second exhaust pipe 58.

Figure 2:
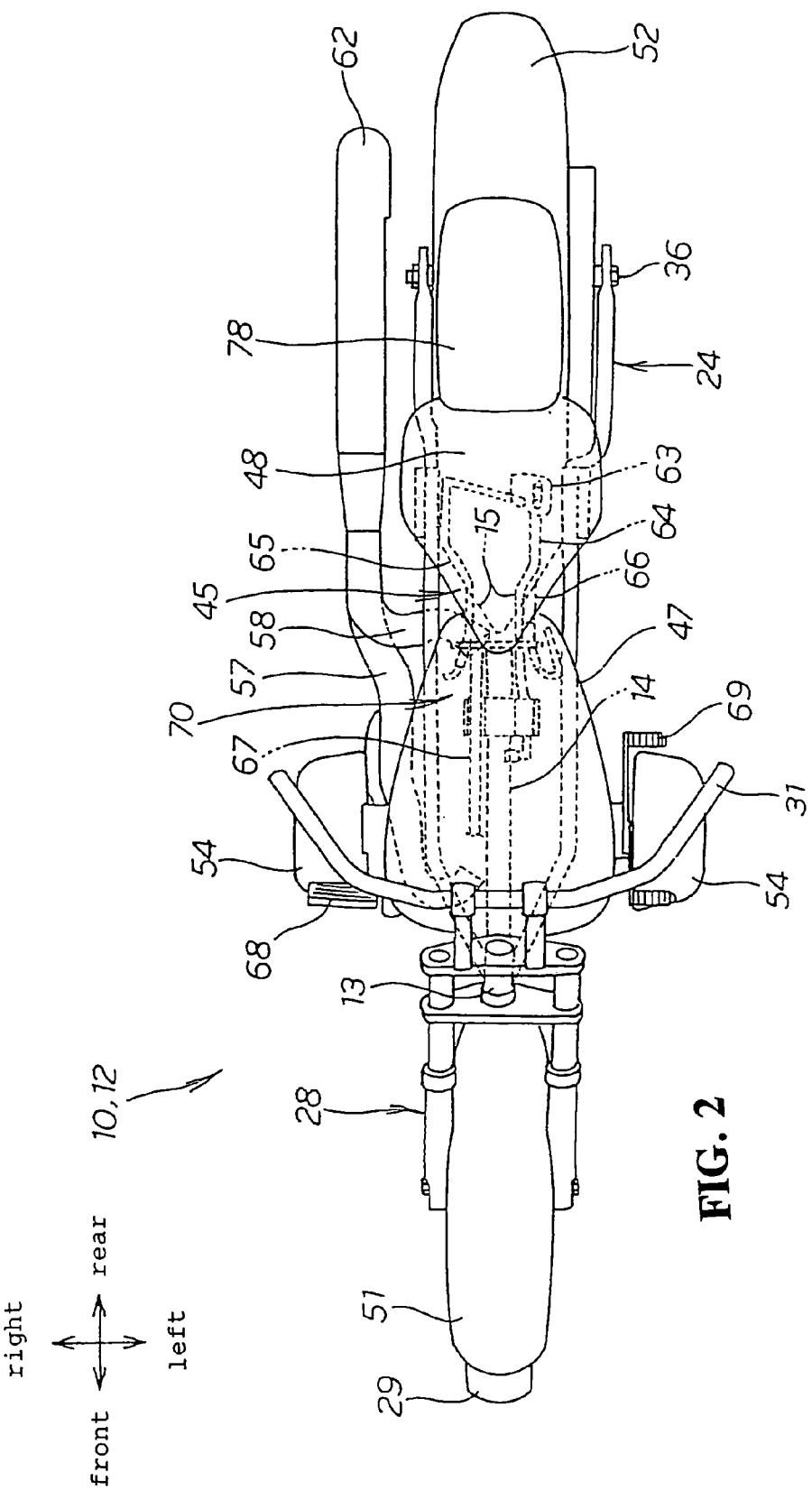
FIG. 2 is a plan view of a motorcycle which includes a wire/pipe support device according to an embodiment of the present invention.

FIG. 2 is a plan view of the motorcycle that includes the wire/pipe support device according to an embodiment of the present invention. The fuel supplying device 45 includes a fuel tank 47 mounted on the main frame 14. A fuel takeout pipe 66 serves to take out fuel from the fuel tank 47. A fuel pump 63 sucks and pressurizes fuel by way of a fuel takeout pipe 66 and supplies the fuel to the engine 33 (see FIG. 1). A fuel feed pipe 64 connects the fuel pump 63 and the engine 33 and supplies the fuel to the engine 33. A fuel return pipe 65 connects the fuel pump 63 and the fuel tank 47 and returns excessive fuel to the fuel tank 47. Reference numeral 67 identifies wires for electric equipment. Reference numeral 68 identifies a brake pedal. Reference numeral 69 identifies a transmission lever.

Figure 3:
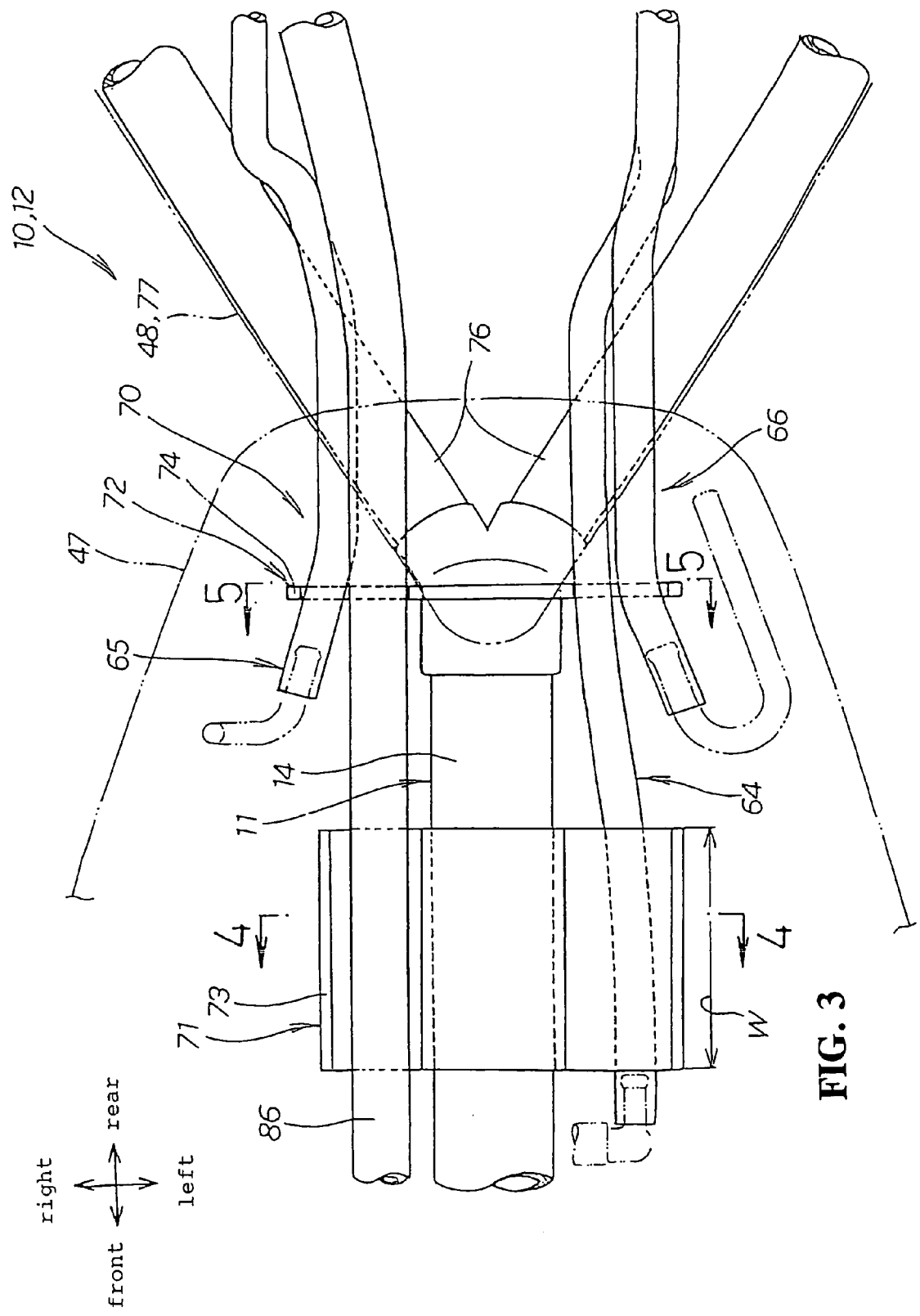
FIG. 3 is a plan view of an essential part of a motorcycle that includes a wire/pipe support device according to an embodiment of the present invention.

The wire/pipe support device 70 is arranged below the fuel tank 47 and the driver's seat 48. The wire/pipe support device 70 will be explained in detail in conjunction with FIG. 3. FIG. 3 is a plan view of an essential part of the motorcycle that includes the wire/pipe support device according to an embodiment of the present invention. The wire/pipe support device 70 includes a first support device 71 arranged below the fuel tank 47, and a second support device 72 arranged below the fuel tank 47 and the driver's seat 48.

The accommodating portion 73 of the first support device 71 has a fixed width W in the longitudinal direction of the vehicle body. Furthermore, the accommodating portion 73 of the first support device 71 is arranged below the fuel tank 47 and is also arranged not to project from the fuel tank 47 as viewed in a plan view. The accommodating portion 73 of the first support device 71 and an accommodating portion 74 of the second support device 72 are arranged below the fuel tank 47 and are arranged not to project from the fuel tank 47 as viewed in plan view, thus preventing a wire or a pipe 76 (hereinafter, also referred to wire/pipe 76) from being observed from above.

In this embodiment, the accommodating portions 73, 74 of the first and second support devices 71, 72 are arranged below the fuel tank 47. However, the accommodating portions 73, 74 may be arranged below the driver's seat 48 with no problem. In this case, by arranging the accommodating portions 73, 74 not to project from the driver's seat 48 as viewed in plan view, it is possible to prevent the wire/pipe 76 from being observed from above.

Figure 4:
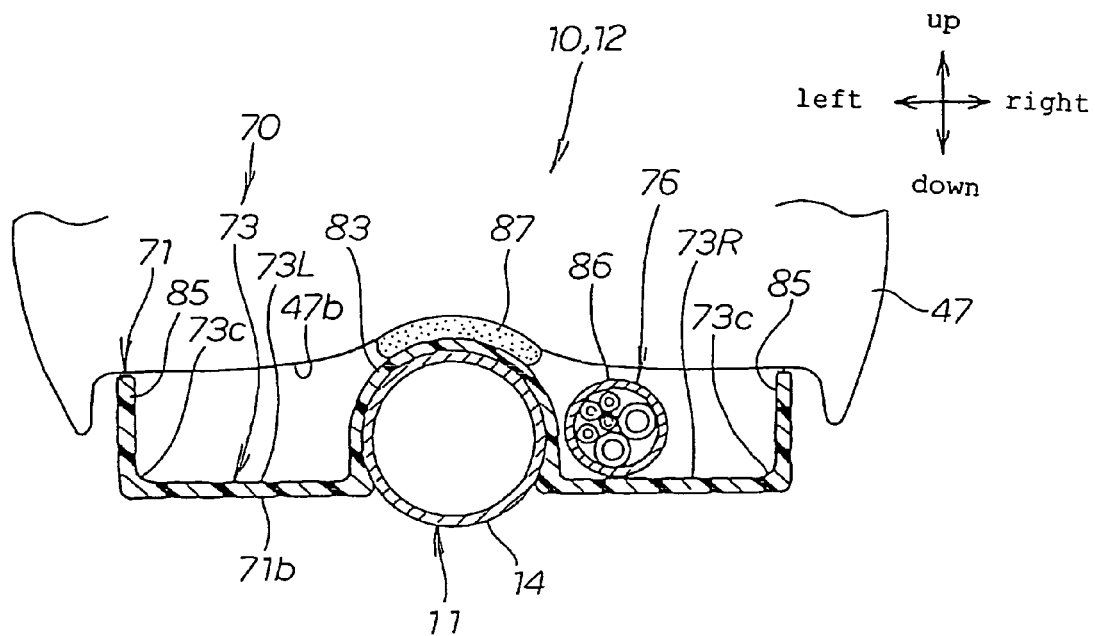
FIG. 4 is a cross-sectional view taken along a line 4-4 in FIG. 3.

FIG. 4 is a cross-sectional view taken along a line 4-4 in FIG. 3. The first support device 71 includes an engaging portion 83 that has a lower surface 71b thereof opened and is engaged with the vehicle body frame 11 from above. Accommodating portions 73L, 73R extend in the left and right directions of the vehicle 12 from the engaging portion 83 and support the wire/pipe 76 from below. Side plates 85, 85 are raised upwardly from end portions 73c, 73c of the accommodating portions 73L, 73R thus preventing the wire/pipe 76 from projecting sideward. The first support device 71 is a member that is integrally formed of the engaging portion 83 and the accommodating portions 73L, 73R.

A wire 86 is accommodated in the accommodating portions 73L, 73R. By allowing the fuel tank 47 to push the engaging portion 83 from above by way of a cushion member 87, it is possible to prevent the floating of the wire/pipe support device 70 from the vehicle body frame 11 and the rotation of the wire/pipe support device 70 about the vehicle body frame 11.

Figure 5:
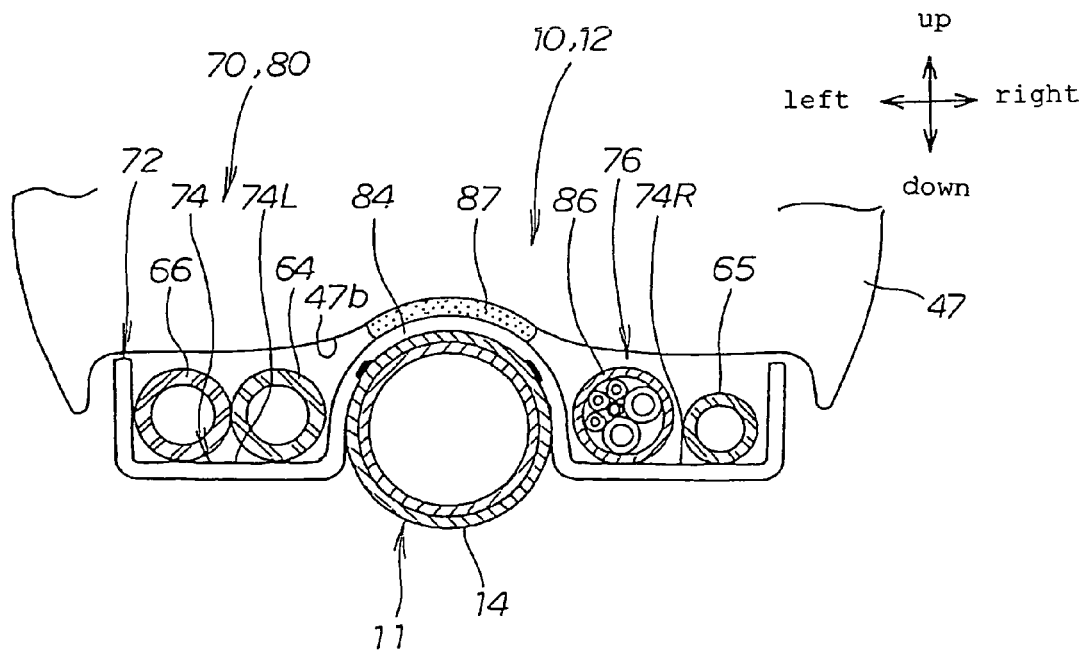
FIG. 5 is a cross-sectional view taken along a line 5-5 in FIG. 3.

FIG. 5 is a cross-sectional view taken along a line 5-5 in FIG. 3. To explain mainly points that make the construction shown in FIG. 5 different from the construction shown in FIG. 4, a longitudinal width of the accommodating portions 74L, 74R of the second support device 72 is made shorter than a longitudinal width of the accommodating portions 73L, 73R of the first support device 71. In addition, steel is used as a material of the second support device 72 and the second support device is fixed to the main frame 14 by spot welding. A fuel feed pipe 64 and a fuel takeout pipe 66 are sequentially arranged from an inner side to an outer side of the left accommodating portion 74L. In addition, the wire 86 and a fuel return pipe 65 are arranged in this order from an inner side to an outer side of the right accommodating portion 74R.

Since the longitudinal length of the second support device 72 is made shorter compared to the length of the first support device 71, steel is adopted as the material of the second support device 72 for imparting predetermined rigidity to the second support device 72. Although steel is adopted as the material of the second support device 72 in this embodiment, there is no problem in elongating the second support device 72 in the longitudinal direction and forming the second support device 72 using a resin. The second support device 72 may be made of either steel or a resin.

The wire/pipe support device 70 forms the groove-shaped engaging portions 83, 84 which have lower surfaces thereof opened and engaged with the main frame 14 that constitutes the vehicle body frame 11 of the motorcycle 10. The groove-shaped accommodating portions 73, 74 have upper surfaces thereof opened and the wire/pipe 76 is received thereon. The wire/pipe support device 70 is mounted on the vehicle body frame 11 by having the engaging portions 83, 84 thereof engaged with the vehicle body frame 11 from above. The wire/pipe 76 is placed on the accommodating portions 73, 74 thus supporting the wire/pipe 76 on the vehicle body frame 11.

There is no problem in allowing the fuel tank 47 to directly push the wire/pipe support device 70 from above without using the cushion member. By allowing the fuel tank 47 to push the wire/pipe support device 70 from above directly or by way of the cushion member, the floating of the wire/pipe support device 70 from the vehicle body frame 11 and the rotation of the wire/pipe support device 70 about the vehicle body frame 11 are prevented. Therefore, it is possible to fixedly secure the wire/pipe 76 to the vehicle body frame 11.

The accommodating portions 73, 74 are arranged on left and right sides with the engaging portions 83, 84 therebetween. Therefore, the accommodating portions 73, 74 are well-balanced and the accommodating portions 73, 74 can easily maintain their posture before being covered with the fuel tank 47 from above. Since the accommodating portions 73, 74 can easily maintain their posture, the accommodating portions 73, 74 can further enhance the mountability of the wire/pipe 76.

By increasing the width of the accommodating portions 73, 74 that are provided on the left and right sides, the accommodating portions 73, 74 can further enhance the ability of accommodating the wire/pipe 76. Furthermore, the accommodating portions 73, 74 are allowed to have the fixed width W (see FIG. 3) in the longitudinal direction of the vehicle body. Therefore, it is possible to make the wire/pipe 76 hardly observed as viewed from below. The material of the first support device 71 is a resin.

In this embodiment, although the driver's seat 48 is exemplified as the seat 77, the seat 77 may be a pillion seat 78 (see FIG. 1). The accommodating portions 73, 74 may be covered with either the fuel tank 47 or the seat 77. The wire/pipe support device 70 is configured such that the wire/pipe support device 70 is pushed by a lower surface 47b of the fuel tank 47 or a lower surface of the seat 77 thus preventing the floating of the wire/pipe support device 70 from the vehicle body frame 11.

Figure 6:
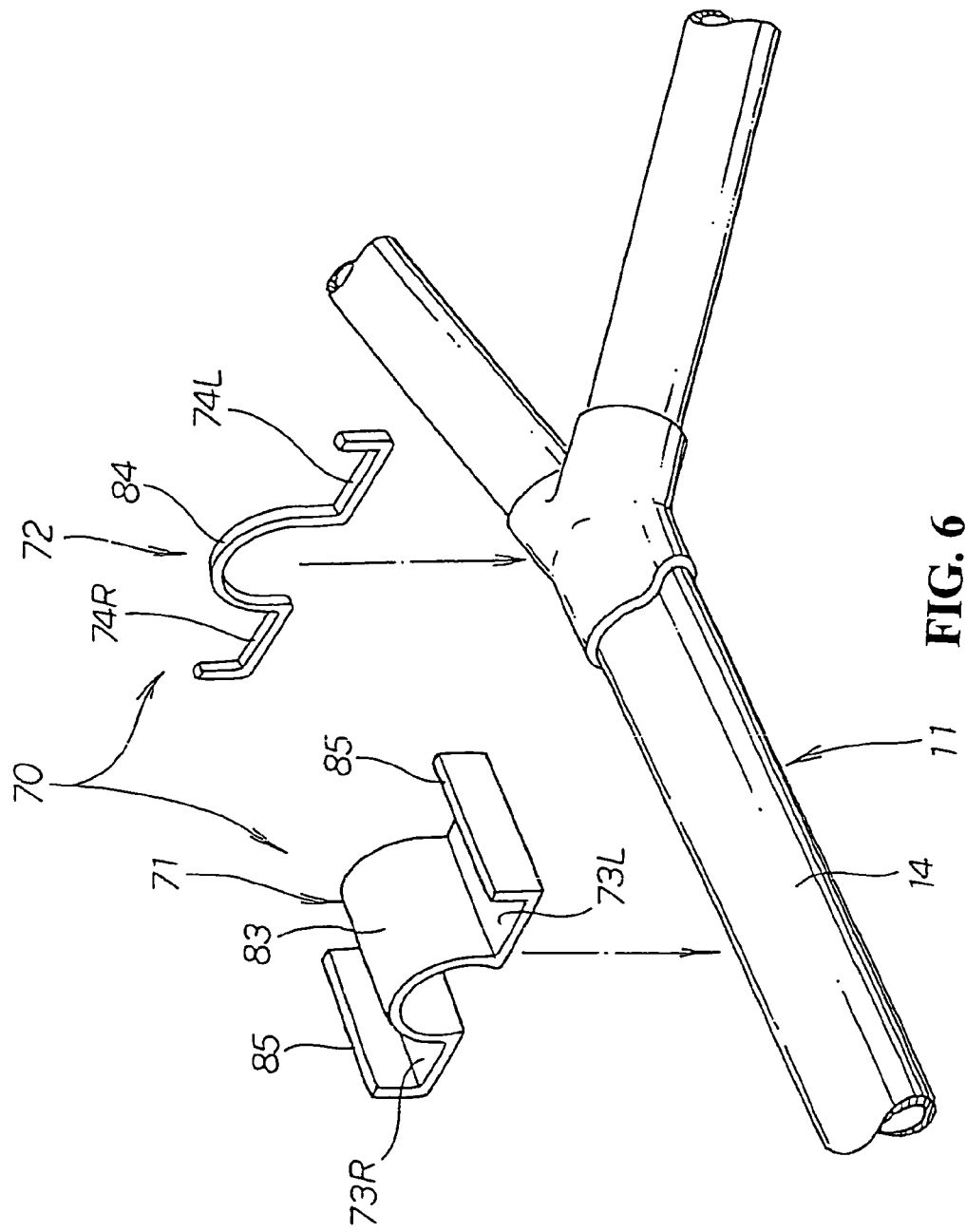
FIG. 6 is a view for explaining an engagement of a wire/pipe support device with a vehicle body frame according to an embodiment of the present invention.

FIG. 6 is a view for explaining the engagement of the wire/pipe support device with the vehicle body frame according to an embodiment of the present invention. The first support device 71 is engaged with the main frame 14 that constitutes the vehicle body frame 11 from above. At the same time, the second support device 72 is engaged with the main frame 11 from above.

The first support device 71 is made of resin and is merely engaged with the vehicle body frame from above. On the other hand, the second support device 72 is made of steel and is, after being engaged with the vehicle body frame from above, fixed to the main flame 14 by spot welding. In addition to such fixing modes, the first support device 71 may be engaged with the vehicle body frame and, thereafter, the first support device 71 may be fixed to the main frame 14 using a fastening means such as bolts without problem. Whether the wire/pipe support device 70 is fixedly secured or not can be determined arbitrarily.

The manner of operation of the wire/pipe support device described heretofore will now be explained in detail. Returning back to FIG. 5, the engaging portion 84 and the groove-shaped accommodating portion 74 are formed in the wire/pipe support device 70 that constitutes one unit of member 80. Thereafter, the wire/pipe is placed on the accommodating portion 74 to accommodate the wire/pipe 76 therein. Accordingly, the forming of the vehicle body frame 11 becomes unnecessary. Since the wire/pipe 76 can be supported in this manner and the forming of the vehicle body frame 11 is unnecessary, it is unnecessary to increase the degree of forming of the vehicle body frame 11. Accordingly, it is possible to prevent the increase of the manufacturing cost of the vehicle body frame 11.

The wire/pipe 76 is placed on the accommodating portion 74 by increasing the size of the accommodating portion 74. Therefore, it is possible to ensure a cross-sectional area for accommodating a required quantity of wires or pipes. Furthermore, the wire/pipe support device 70 forms the groove-shaped engaging portion 84 that has the lower surface thereof opened and is engaged with the vehicle body flame 11. The wire/pipe support device 70 is mounted on the vehicle body flame 11 by engaging the engaging portion 84 with the vehicle body frame 11 from above whereby the mounting operation can be easily performed.

In this embodiment, the wire/pipe support device according to an embodiment of the present invention includes the wire/pipe support device engaged with a vehicle body frame from above. Thereafter, the engaging portion is pushed by the fuel tank or the seat thus fixing the wire/pipe support device to the vehicle body frame. However, the wire/pipe support device may be fixed by a connecting device such as a bolt, for example, without pushing the engaging portion of the wire/pipe support device from above by the fuel tank or the seat.

The present invention is favorably applicable to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wire/pipe support device of a motorcycle that supports a wire/pipe on a vehicle body frame, comprising:
   at least one wire/pipe support member, each of said at least one wire/pipe support member being formed from a single member and including:
      a groove-shaped engaging portion that is engaged with the vehicle body frame and has an open lower surface thereof; and
      a groove-shaped accommodating portion that receives the wire/pipe thereon and has an open upper surface thereof,
   wherein each of said at least one wire/pipe support member is mounted on the vehicle body frame by having the groove-shaped engaging portion thereof engaged with the vehicle body frame from above, and the wire/pipe is placed on the groove-shaped accommodating portion to support the wire/pipe on the vehicle body frame,
   wherein the wire/pipe support device of the motorcycle is configured to be pushed from above by a fuel tank directly or by way of a cushion member thus preventing the floating of the wire/pipe support device from the vehicle body frame and the rotation of the wire/pipe support device about the vehicle body frame.

2. The wire/pipe support device of a motorcycle according to claim 1, wherein the accommodating portion is arranged on left and right sides and the engaging portion is arranged therebetween.

3. The wire/pipe support device of a motorcycle according to claim 1, wherein the accommodating portion has a fixed width in the longitudinal direction of the vehicle body frame.

4. The wire/pipe support device of a motorcycle according to claim 1, wherein the accommodating portion is arranged below a fuel tank and is arranged not to project from the fuel tank as viewed in plan view.

5. The wire/pipe support device of a motorcycle according to claim 1, wherein the accommodating portion is arranged below a seat and is arranged not to project from the seat as viewed in plan view.

6. The wire/pipe support device of a motorcycle according to claim 1, wherein there are two of said at least one wire/pipe support member, a first of the wire/pipe support members being mounted on the vehicle body frame in front of the second of the wire/pipe support members.

7. The wire/pipe support device of a motorcycle according to claim 6, wherein the first and second wire/pipe support members receive a wire and fuel pipes in their accommodating portions.

8. A support device for a vehicle that supports a wire or pipe on a vehicle body frame, comprising:
   a support member, said support member being formed from a single member and including:
      a groove-shaped engaging portion that has an open lower surface and is mounted to a top of the vehicle body frame; and
      a pair of groove-shaped accommodating portions located on opposite sides of said groove-shaped engaging portion, each of said pair of groove-shaped accommodating portions having an open upper surface that supports the wire or pipe thereon,
   wherein the support device is configured to be pushed from above by a fuel tank directly or by way of a cushion member thus preventing the floating of the support device from the vehicle body frame and the rotation of the support device about the vehicle body frame.

9. The support device for a vehicle according to claim 8, wherein the open upper surface of each of the accommodating portions has a rectangular-shape.

10. The support device for a vehicle according to claim 8, wherein each of the accommodating portions is arranged below a fuel tank and is arranged not to project from the fuel tank as viewed in plan view.

11. The support device for a vehicle according to claim 8, wherein each of the accommodating portions is arranged below a seat and is arranged not to project from the seat as viewed in plan view.

12. The support device for a vehicle according to claim 8, wherein there are two of said support members, a first of the support members being mounted on the vehicle body frame in front of the second of the support members.

13. The support device for a vehicle according to claim 12, wherein the first and second support members receive a wire and fuel pipes in their accommodating portions.

* * * * *